(12) United States Patent
Zdarsky et al.

(10) Patent No.: US 8,908,514 B2
(45) Date of Patent: Dec. 9, 2014

(54) METHOD FOR SUPPORTING HANDOVER MECHANISMS

(75) Inventors: Frank Zdarsky, Karlsruhe/Durlach (DE); Patrick Stupar, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 286 days.

(21) Appl. No.: 13/061,531

(22) PCT Filed: Apr. 20, 2009

(86) PCT No.: PCT/EP2009/002865
§ 371 (c)(1),
(2), (4) Date: May 20, 2011

(87) PCT Pub. No.: WO2010/022804
PCT Pub. Date: Mar. 4, 2010

(65) Prior Publication Data
US 2011/0216742 A1    Sep. 8, 2011

(30) Foreign Application Priority Data
Sep. 1, 2008  (EP) .................................. 08015390

(51) Int. Cl.
*G01R 31/08* (2006.01)
*H04W 36/00* (2009.01)

(52) U.S. Cl.
CPC .................................. *H04W 36/005* (2013.01)
USPC ............ 370/231; 370/238; 370/331; 370/400

(58) Field of Classification Search
CPC ..... H04W 36/26; H04W 80/04; H04W 36/02; H04L 47/14; H04L 47/824
See application file for complete search history.

(56) References Cited

U.S. PATENT DOCUMENTS

| 2006/0099948 | A1* | 5/2006 | Hoghooghi et al. | .......... 455/436 |
| 2006/0121916 | A1* | 6/2006 | Aborn et al. | ............... 455/456.5 |
| 2008/0137615 | A1* | 6/2008 | Park et al. | ..................... 370/332 |
| 2010/0048213 | A1 | 2/2010 | Kim et al. | |

FOREIGN PATENT DOCUMENTS

| GB | 2 429 609 A | 2/2007 |
| JP | 2006520119 A | 8/2006 |
| KR | 10-2006-0114606 A | 11/2006 |
| WO | 2004079949 A1 | 9/2004 |

OTHER PUBLICATIONS

Korean Office Action, dated Jul. 20, 2012, from corresponding Korean application.

(Continued)

*Primary Examiner* — Jung Park
(74) *Attorney, Agent, or Firm* — Young & Thompson

(57) ABSTRACT

A method for supporting handover mechanisms, in particular Media Independent Handover (MIH) mechanism according to the IEEE 802.21 standard, wherein a user equipment (UE) attaches to an access network (AN) via points of attachment (PoAs), wherein signalling messages are exchanged between the entities participating in the handover process, in particular between the user equipment and the points of attachment, and wherein the handover mechanism supports changing the network connection of the user equipment from one of the points of attachment—current point of attachment (PoA)—to another one of the points of attachment—target point of attachment—while maintaining all ongoing communication of the user equipment, is characterized in that information about the user equipment's ongoing communication is added to the signalling messages exchanged in the handover process, wherein the information is employed to treat individual traffic flows of the user equipment's ongoing communication selectively during the handover process.

23 Claims, 1 Drawing Sheet

(56) References Cited

OTHER PUBLICATIONS

Ryuichi Takechi, et al., "Network Selection and Route Management for the Mobile Networks", 2006, vol. J89-B, No. 2, pp. 195-203.
Translation of Japanese Office Action, dated Aug. 29, 2012, from corresponding JP application.
International Search Report, dated Aug. 31, 2009, from corresponding PCT application.
Vitor Jesus et al., "Integration of Mobility and QoS in 4G Scenarios", Proceedings of the 3rd ACM Workshop on QoS and Security for Wireless and Mobile Networks, Oct. 22, 2007, pp. 47-54, XP-002542089; Cited in International Search Report.
Hesham Soliman et al., "Flow movement in Mobile IPv6", IETF Standard-Working-Draft, Internet Engineering Task Force, Jun. 1, 2003, pp. 1-8, No. 3; Cited in International Search Report.

\* cited by examiner

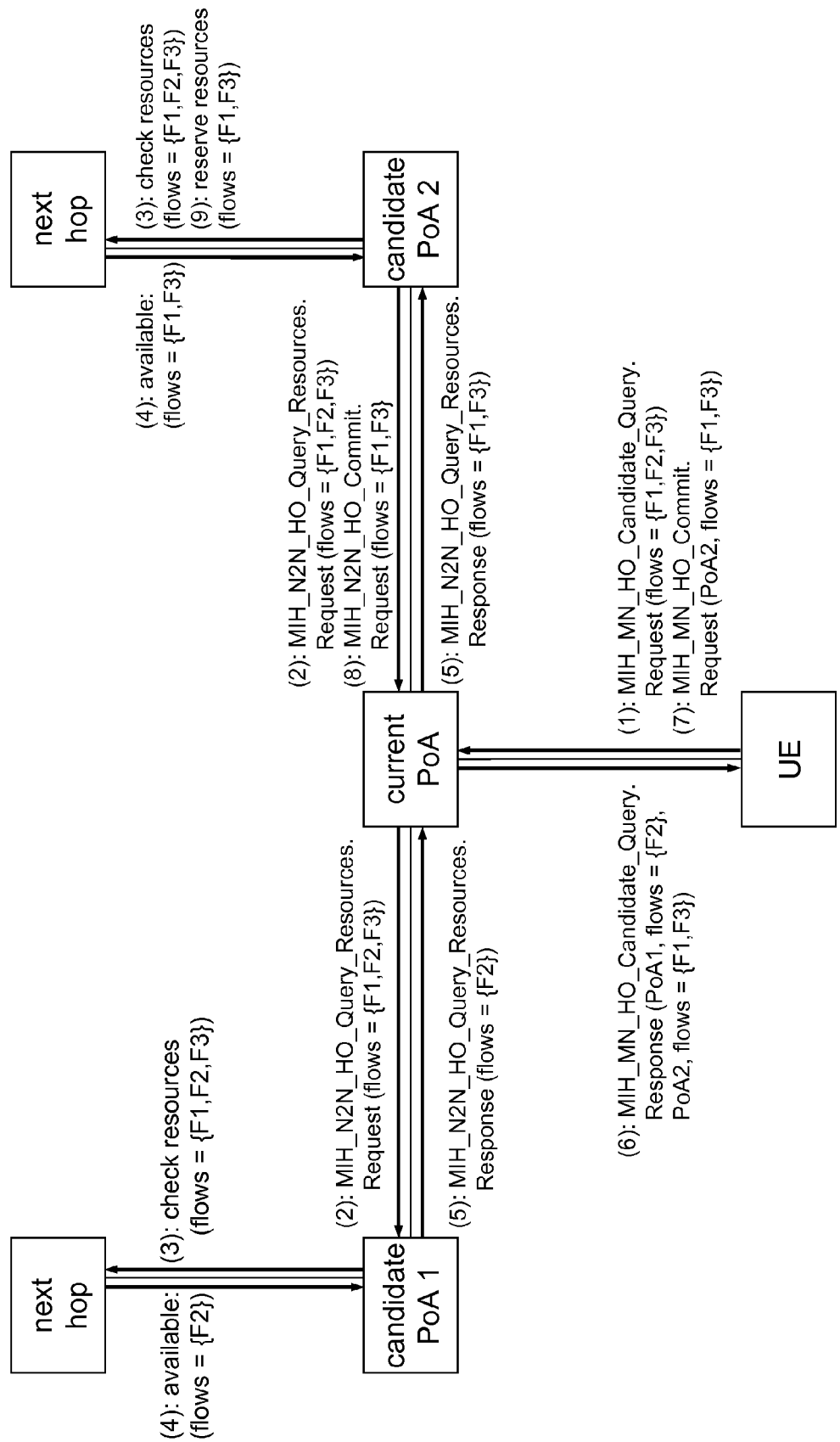

METHOD FOR SUPPORTING HANDOVER MECHANISMS

The present invention relates to a method for supporting handover mechanisms, in particular Media Independent Handover (MIH) mechanism according to the IEEE 802.21 standard, wherein a user equipment attaches to an access network via points of attachment, wherein signalling messages are exchanged between the entities participating in said handover process, in particular between said user equipment and said points of attachment, and wherein said handover mechanism supports changing the network connection of said user equipment from one of said points of attachment—current point of attachment—to another one of said points of attachment—target point of attachment—while maintaining all ongoing communication of said user equipment.

In recent years several types of wireless communication systems have been developed. For example, wireless local area networks (WLAN) are widely spread nowadays, cellular networks, such as Universal Mobile Telecommunication Systems (UMTS), have gained paramount importance, and, most recently, WiMAX (defined as World Wide Interoperability for Microwave Access) has been developed as a standard-based technology enabling the delivery of last mile wireless broadband access. Each of these technologies provides different types of services and specific applications. The wide availability of co-located technologies and the growing trend of users' mobility require the seamless support of mobility and service continuity. However, due to the large number of new access technologies, it is very difficult to provide seamless mobility across these technologies.

In a general scenario, a mobile node like a user's communication device/terminal, in the following referred to as user equipment UE, is attached to an access network via a point of attachment PoA. PoAs constitute a UE's point of network connection and act as a kind of relay node enabling data communication between the UE and the access network. The term PoA is used in a generic sense and may include for example access points (e.g. in WLANs) or a base stations (e.g. in UMTS networks). Generally, a PoA may be any device that is able to allow for data exchange between a UE and a network. Handover mechanisms usually support changing the network connection of the UE—which may include for example, but not limited to, a personal digital assistant (PDA), a mobile phone, a notebook, a home network—from one PoA (current PoA) to a different PoA (target PoA) while maintaining all ongoing data communication. Such a handover may be executed for several reasons, e.g. in order to change to a more economic access network, to change from a wired Digital Subscriber Line (DSL) to a wireless UMTS connection or to change the wireless access point because of poor radio signal conditions.

The change of—wired or wireless—links between the UE and the PoA is typically realised as a link-layer handover, possibly followed by further handover-related procedures at higher layers, and is facilitated by a number of mechanisms. Handovers may be initiated from the UE or the access network and may be performed in a number of different ways. Notwithstanding specific differences, handovers essentially include the following steps:

Triggering of a handover process by the UE or the network
Preparing a list of handover candidate PoAs
Checking each handover candidate PoA whether it has sufficient resources for the UE and whether the UE is allowed to use them
Selecting a candidate PoA as target PoA
Executing the handover to this target PoA For seamless handover between different types of networks, the IEEE 802.21 MIH specification has been developed. The scope of the IEEE 802.21 standard is to develop a specification that provides link layer intelligence and other related network information to upper layers to help mobility decision functions (located both in the UE and in the network) and to optimize handovers between heterogeneous media. In this context "media" refers to the method or mode of accessing a telecommunication system (e.g. cable, radio, satellite, etc.), as opposed to sensory aspects of communication (e.g. audio, video, etc.). The MIH Function (MIHF) is the core component of the 802.21 standard. It provides a set of well defined and standardized Service Access Points (SAP) with both the link layer (MIH_LINK_SAP) and the upper layers (MIH_SAP) that will use this information (MIH users). A set of services is provided through these interfaces in order to facilitate the communication process:

The Media Independent Event Service (MIES) that detects changes in link layer properties and initiates appropriate events (triggers) from both local and remote interfaces.
The Media Independent Command Service (MICS) provides a set of commands for the MIH Users to control link properties that are relevant to handover and switch between links if required.
The Media Independent Information Service (MIIS) provides the static information about different networks and their services thus enabling more effective handover decisions to be made across heterogeneous networks.

In summary, the standard aims at providing means to improve handovers across heterogeneous networks, including 802.X family of networks, 3GPP and 3GPP2 networks, by sharing information, events and commands between MIH peers.

The messages exchanged between the entities participating in the handover contain the resource and Quality of Service (QoS) demands of the UE as well as administrative information such as the UE's identity and security credentials. This information is used to filter out candidate PoAs that do not have sufficient resources to support the UE. If at the time of handover no target PoA with sufficient resources is available, all communication of the UE will be dropped. Thus, the refusal of the communication results in a low effectiveness and causes poor user experience.

It is therefore an object of the present invention to improve and further develop a method of the initially described type for supporting handover mechanisms in such a way that an improvement in terms of a higher effectiveness of handovers is achieved.

In accordance with the invention, the aforementioned object is accomplished by a method comprising the features of claim 1. According to this claim, such a method is characterized in that information about said user equipment's ongoing communication is added to said signalling messages exchanged in said handover process, wherein said information is employed to treat individual traffic flows of said user equipment's ongoing communication selectively during said handover process.

The invention takes into consideration that UEs typically have concurrently established multiple data flows between different applications and/or with different communication partners. In this context, according to the invention it has first been recognized that flows are widely independent of each other and that it is more beneficial, in particular from a user experience point of view, to keep at least a few flows than dropping all of them. Specifically, it has been recognized that handover optimizations can be achieved by adding information about a UE's ongoing data flows to the messages exchanged in the handover process, which enables data flows to be treated selectively during and after the handover process. In fact, by such extension it becomes possible to handle multiple data flows by the same user equipment differently on the communication link between the UE and the access network or even inside the access network. Thus, the adaption of the signalling messages by including individual flow related information provides an effective preserving of ongoing flows, minimizes the number of flows that have to be dropped and thereby implies a significant enhancement of user experience.

The method according to the invention can be suitably applied, for instance, in MIH environments according to the IEEE 802.21 standard. However, it is to be understood that the invention is applicable in any scenario in which a handover mechanism supports changing the network connection of a UE to a different PoA while maintaining ongoing data communication. Consequently, when the invention is described with respect to MIH in the following, this reference is to be understood as an exemplary reference only, and it is to be expressly pointed out that it is in no way intended to limit the invention in any way.

In a preferred embodiment the information added to the signalling messages includes information regarding each flows resource requirements and/or QoS demands, for example but not limited to bandwidth, delay, jitter (delay variation) or (packet) loss parameters. This information may support the decision process for selectively treating flows in a way that is most favourable adapted to specific characteristics of individual or group of flows.

Additionally or alternatively, the signalling messages may contain information regarding the type of each flow, for example audio/video or web traffic. For instance, short-lived sessions such as accessing a single web page typically do not require handover or QoS. Longer duration sessions, which may well require handover, such as VoIP, audio/video streaming (including live TV and Video-on-Demand), and VPNs (Virtual Private Networks), typically have QoS requirements like those mentioned before. The information regarding the type of each flow added to the signalling messages may guarantee that each flow's individual QoS demands are maintained, not only before and after a handover, but also during the handover.

Advantageously, the signalling messages may contain additional information regarding the priority and/or importance of each flow as absolute value or relative to other flows. For example, based on such information a PoA could preferentially offer to take over the UE's of higher priority, like real-time multimedia applications, than flows of lower priority, like e.g. accessing a single web page, and send a pertinent notification/message to the UE. As a result, the inclusion of priority and/or importance related information supports the observance of time limits of real-time based flows and assures that the handover process is performed in a smooth flowing way.

The information added to the signalling messages may include information regarding dependencies between individual flows and/or groups of flows. For instance, the video channel and the audio channel of a multimedia session, e.g. a movie stream, could be indicated as being dependent on each other. By using such dependency information, the handover process can be performed in an optimized way in as much as a dismembering of two or more flows that depend on each other by handing them over to different entities could be avoided as far as possible.

The information added to the signalling messages, especially the information mentioned above, may include information on individual flows from protocols of various higher levels of the networking stack, e.g. information on the multimedia streams encoded inside flows. In this context it is important to note that individual layers of the networking stack are, in general, implemented separately and independent from each other. Since the handover process is typically provided by the lower layers, in particular by the link layer, it may be beneficial to use certain information about flows from higher layers in order to facilitate a higher selectivity. For example, considering the case of watching a video, for some reason, it may be preferable to provide the images of the video only without the associated audio/sound information, or vice versa. Then either image or audio/sound related information may be handed down from higher layers to lower layers for performing the handover.

As what concerns the initiation of a handover process, a trigger may be provided either by the UE itself—e.g. in case of poor connectivity—or from a network side. If the handover process is triggered from a network side, the trigger may be originated by the current—serving—PoA of the access network, for example.

Generally, the access network is connected to a core network, wherein the access network constitutes the part of a communications network that connects subscribers to their service providers. The core network, for example the Networking Switching Subsystem (NSS) in GSM (Global System for Mobile Communications), is the counterpart of the access network. Therefore the reason for the handover may come from the access network or the core network. For example, the reason may come from a function located in the core network, which performs resource management or load balancing for the purpose of increasing system throughput and reducing application response time.

Advantageously, it may be provided that the handover process can be triggered for all traffic flows of the UE together or for single or groups of flows of the UE individually. Hence, an extended handover preparation and execution on the basis of per-flow information is possible, such as resource reservations on the access links or within the access network, or admitting only a subset of flows due to resource constraints.

With respect to an efficient flow administration and a distinct and unambiguous identification of flows, the signalling messages may contain individual identifiers or a list of identifiers for all or for a subset of the UE's currently active flows. The identifier may function as reference to an entry in a table that contains summarized flow information.

With respect to the ascertainment of the target PoAs, it may be provided that first a set of one or more candidate PoAs is determined from the PoAs to which the UE's traffic flows may potentially hand over. Signalling messages may be sent to a candidate PoA directly or to another entity acting as a proxy for that candidate PoA. In a next step each of the candidate PoAs may be queried to determine whether single flows or groups of flows of the UE are eligible to hand over. In particular, the query may include a demand to determine whether sufficient resources are available to support singles or groups of flows of the UE at each candidate PoA. It is to be noted that this resource check performed by the candidate PoAs includes the case of determining whether they can support all flows of the UE. In this special case all flows of the UE would be eligible to hand over to a single candidate PoA.

In a further step it may be provided that the candidate PoAs, in particular upon being queried, perform various tasks. For example, but not limited to, the candidate PoAs may perform admission control tests and resource availability checks for the access links, the backhaul links or for both on each flow individually or on a group of flows. Based on the results of the tests/checks carried out by the candidate PoAs, it may be provided that the candidate PoAs respond with a signalling message indicating a subset of flows they may support. With respect to higher overall flexibility, a candidate PoA's response may additionally include a list of alternative subsets of flows it may as well support. Different possible subsets may be coequal or may have unequal priorities. Furthermore, in this connection it is to be noted that it is not always intended from a PoA's point of view, e.g. due to missing user credentials/authorization for that PoA, to take the maximum number of flows for which resources would be available. For example, a mobile phone service provider may permit a user to conduct telephone calls only and may block other services, like internet access. In such cases an alternative subset could include those flows the PoA is actually willing to take over in a handover process.

Advantageously, the entity preparing the handover decides on which candidate PoAs are selected as target PoAs to which individual flows or set of flows are handed over. The decision may be based on the responses received from the candidate PoAs. The entity preparing the handover may be, for example, but not limited to, the UE itself (typically in a WLAN), the currently serving PoA or a central coordinator implemented e.g. in the access network. In particular, in a GSM/UMTS network the entity preparing and making decisions on the handover may be the mobile network operator.

In the context of a concrete application, the entity preparing the handover may decide that only a subset of the UE's currently active flows is handed over, while the rest is being dropped.

Furthermore, the entity preparing the handover may decide to hand over some of the UE's currently active flows to one target PoA and others to one or more other target PoAs. For instance, this could be the case if there is currently no target PoA available which has sufficient resources for all currently active flows of the UE.

As a result the UE may be connected to multiple PoAs after the handover, if it is supported by the UE and the according access network. However, it is to be understood that also before carrying out the handover the UE may be connected to multiple PoAs. This may be a result of previous handovers.

Advantageously, it may be provided that the signalling messages used to signal a handover execution to the target PoAs or to signal the release of resources to formerly active PoAs or candidate PoAs also carry information on the individual flows to hand over or not to handover, respectively. This information may be contained either explicitly or implicitly by adding information that facilitates the PoAs to recover this information from previous message exchanges. After gathering information data about the available resources on a per-flow basis, the entity preparing the handover decides on the concrete realisation of the handover. In this context the entity that makes the decision takes into consideration the credentials and/or authorizations of the UE concerning the utilization of the resources. The result of the decision process may be sent to the neighbouring entities on a per-flow basis.

According to a preferred embodiment, the information on the individual flows added to the signalling messages may be used by the target PoAs to reserve resources for each flow on the access link and inside the access network.

Furthermore, the information on the individual flows may be used by the target PoAs to map flows to routes through the access network.

The respective resources may be allocated by the target PoAs for individual flows or set of flows and the necessary state may be installed e.g. in the MIHF.

It is noted that the method as described herein are not exclusive of MIH as defined in the IEEE 802.21 specification. It becomes clear to someone skilled in the art that the method as described above applies to any existing or upcoming protocol with similar mechanisms or functionalities.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the FIG. on the other hand. In connection with the explanation of the preferred embodiments of the invention by the aid of the FIG., generally preferred embodiments and further developments of the teaching will we explained. In the drawing the only.

FIG. is a schematic view illustrating an example of an application scenario of a method according to the present invention.

The only FIG. shows an example application scenario in the context of the IEEE 802.21 standard. In the illustrated embodiment user equipment UE is connected to an access network via a point of attachment, which is denoted current point of attachment PoA. In addition to the current PoA, two further points of attachment, which are denoted candidate PoA1 and candidate PoA2, provide the UE potential access to the same or another access network. The only FIG. illustrates a possible handover scenario and shows how IEEE 802.21 messages may be extended according to the invention, so that candidate PoAs may check resource availability both on the access link and in the backhaul on a per-flow basis. This allows PoAs to communicate that they only have resources available for a subset of flows. It is possible that the PoAs may offer alternative subsets of flows, too. The UE in turn may request handovers for subsets of its flows, even to multiple PoAs. It is noted again that in case of describing the invention with respect to MIH, this reference is to be understood as an exemplary reference only, and once more it is to be expressly pointed out that it is in no way intended to limit the invention in any way.

In the following the single steps of the exemplary embodiment illustrated in the FIG. are described in some more detail. A UE, which may be a PDA, a notebook or a home network, is connected to a serving network via a PoA, which may be an access point or a base station and which in the following will be referred to as current PoA. In the initial situation, the current PoA provides the communication between the UE and the network for the flows F1, F2 and F3. In a first step (1) the UE, or more precisely an MIH user on the UE, wishes to perform a handover to other PoAs, e.g. due to a suboptimal connectivity situation. To this end the primitive MIH_MN_HO_Candidate_Query Request is generated by the UE to inform the MIHF to query candidate PoAs for possible handover initiation. In particular, the MIH_MN_HO_Candidate_ Query Request answers the purpose to get information of whether the QoS resources of the ongoing data sessions can be supported in the candidate networks. The MIH_MN_HO_Candidate_Query Request contains the usual parameters according to the IEEE 802.21 standard together with additional parameters concerning the currently active flows F1, F2 and F3 of the UE.

Next, the primitive MIH_N2N_HO_Query_Resources Request is used by an MIHF on the serving network, i.e. on the current PoA, to communicate with its peer MIHFs on the candidate network. In the embodiment illustrated in the FIG. this communication is established with the MIHF on the candidate points of attachment PoA1 and PoA2 (2). The MIH_N2N_HO_Query_Resources Request is generated by the current PoA after having received the MIH_MN_HO_Candidate_Query Request message from the UE and is sent to one or multiple candidate PoAs. The MIH_N2N_HO_Query_Resources Request is used to prepare new link resources for the impending handover and to query the available link resource of the candidate networks. Again, the MIH_N2N_HO_Query_Resources Request includes information about the individual flows F1, F2, and F3.

Upon receipt of the MIH_N2N_HO_Query_Resources Request message, in steps (3) the candidate PoAs—candidate PoA1 and candidate PoA2—check the resource availability on a per-flow basis in the respective candidate networks, in this exemplary embodiment by contacting the nodes of the respective candidate networks that constitute the next hops. However, the respective availability information could also already be stored on the candidate PoAs themselves or retrieved by them from any other candidate network entity, for example a centralized one that stores resource availability information for multiple PoAs or next-hop entities of the same candidate network. In steps (4) the candidate PoAs receive the respective availability information from the candidate networks. Specifically, candidate PoA1 receives information that flow F2 can be supported, and candidate PoA2 receives information that flows F1 and F3 can be supported.

The candidate PoAs respond the results of their resource availability checks to the current PoA by means of an MIH_N2N_HO_Query_Resources Response (5). In a next step, the current PoA notifies the UE of the resulting resource availability at the candidate networks through an MIH_MN_HO_Candidate Query Response (6).

As already mentioned above, PoA1 is able to support flow F2 only, whereas PoA2 is able to support flows F1 and F3. Based on that information, the UE may choose to attach to PoA2 only, thereby effectively dropping flow F2, or to attach to both PoA1 and PoA2 concurrently in order to sustain all three flows. Alternatively, the decision of how to handle individual flows may be left to a network entity, e.g. a PoA such as an access point or a base station. In the example of use illustrated in the FIG., the UE decides to elect only PoA2 as target PoA of the handover and requests from the current PoA a handover to the elected target PoA by sending the MIH_MN_HO_Commit Request (7). Alternatively, it is possible that the serving PoA detects the need for a handover by receiving a local or remote (MIH_)Link_Handover_Imminent Indication and itself elects the target PoA(s) based on the collected flow and availability information. Subsequently, the serving current PoA sends the MIH_N2N_HO_Commit Request to the target PoA (8) to request resource preparation at the target network, which in the embodiment illustrated in the FIG. is accessible via candidate PoA2.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The work leading to this invention has received funding from the European Community's Seventh Framework Programme (FP7/2007-2013) under grant agreement no 214994.

The invention claimed is:

1. Method for supporting handover mechanisms, in particular Media Independent Handover (MIH) mechanisms,
    wherein a user equipment (UE) attaches to an access network (AN) via points of attachment (PoAs),
    wherein signalling messages are exchanged between the entities participating in said handover process, in particular between said user equipment (UE) and said points of attachment (PoAs), and
    wherein said handover mechanism supports changing the network connection of said user equipment (UE) from one of said points of attachment (PoAs)—current point of attachment (PoA)—to another one of said points of attachment (PoAs)—target point of attachment (PoA)—while maintaining all ongoing communication of said user equipment (UE),
    said method comprising adding information about said user equipment's (UE) ongoing communication to said signalling messages exchanged in said handover process such that individual flow related information of said user equipment's (UE) ongoing flows is included in said signaling messages, and
    employing said information to treat individual traffic flows of said user equipment's (UE) ongoing communication selectively during said handover process,
    wherein said information added to said signalling messages includes information regarding each flow's priority and/or importance as absolute value or relative to other flows.

2. Method according to claim 1, wherein said information added to said signalling messages includes information regarding each flow's resource requirements and/or quality of service (QoS) demands, in particular bandwidth, delay, jitter or loss parameters.

3. Method according to claim 1, wherein said information added to said signalling messages includes information regarding the type of said UE's flows.

4. Method according to claim 1, wherein said information added to said signalling messages includes information regarding dependencies between individual flows and/or groups of flows.

5. Method according to claim 1, wherein said information added to said signalling messages includes information on individual flows from protocols of one or more higher levels of the networking stack.

6. Method according to claim 1, wherein said handover process is triggered by said user equipment (UE) or from a network side, in particular by said current point of attachment (PoA).

7. Method according to claim 1, wherein the reason for said handover comes from said access network (AN) or from a core network (CN) said access network (AN) is connected to.

8. Method according to claim 1, wherein said handover process is triggered for all traffic flows of said user equipment (UE) together or for single or groups of flows of said user equipment (UE) individually.

9. Method according to claim 1, wherein said signalling messages contain individual identifiers or a list of identifiers for all or a subset of the user equipment's (UE) currently active flows.

10. Method according to claim 1, wherein from said points of attachment (PoAs) a set of candidate points of attachment (PoAs) is determined to which said user equipment's (UE) traffic flows may potentially hand over.

11. Method according to claim 10, wherein said candidate points of attachment (PoAs) are queried to determine whether single or groups of flows of said user equipment (UE) are eligible to hand over, in particular to determine whether sufficient resources are available to support single or groups of flows of said user equipment (UE) at each candidate point of attachment (PoA).

12. Method according to claim 10, wherein said candidate points of attachment (PoAs) perform various tasks, in particular admission control tests and resource availability checks for the access links and/or the backhaul on each flow individually or on a group of flows.

13. Method according to claim 11, wherein said candidate points of attachment (PoAs) respond with a signalling message indicating a subset of flows or a list of alternative subsets of flows they may support.

14. Method according to claim 10, wherein the entity preparing the handover, preferably on the basis of the responses from said candidate points of attachment (PoAs), decides on which candidate points of attachment (PoAs) are selected as target points of attachment to which individual flows or set of flows are handed over.

15. Method according to claim 1, wherein the entity preparing the handover decides that only a subset of said user equipment's (UE) currently active flows is handed over, while the rest is being dropped.

16. Method according to claim 1, wherein the entity preparing the handover decides to hand over some of the user equipment's (UE) currently active flows to one target point of attachment (PoA) and others to one or more other target points of attachment (PoAs).

17. Method according to claim 1, wherein said user equipment (UE) is connected to multiple points of attachment (PoAs) before and after the handover.

18. Method according to claim 1, wherein said signalling messages used to signal the handover execution to said target points of attachment (PoAs) or the release of resources to old or candidate points of attachment (PoAs) again carry information on the individual flows to hand over.

19. Method according to claim 18, wherein said information is contained either explicitly or implicitly by adding information that facilitate said points of attachment (PoAs) to recover this information from previous message exchanges.

20. Method according to claim 18, wherein said information on the individual flows is used by the target points of attachment (PoA) to reserve resources for each flow on the access link and inside the access network (AN).

21. Method according to claim 18, wherein said information on the individual flows is used by the target points of attachment (PoAs) to map flows to routes through the access network (AN).

22. Method according to claim 11, wherein the respective resources are allocated by said target points of attachment (PoAs) for individual flows or set of flows.

23. Method for supporting handover mechanisms, in particular Media Independent Handover (MIH) mechanisms,
wherein a user equipment (UE) attaches to an access network (AN) via points of attachment (PoAs),
wherein signalling messages are exchanged between the entities participating in said handover process, in particular between said user equipment (UE) and said points of attachment (PoAs), and
wherein said handover mechanism supports changing the network connection of said user equipment (UE) from one of said points of attachment (PoAs)—current point of attachment (PoA)—to another one of said points of attachment (PoAs)—target point of attachment (PoA)—while maintaining all ongoing communication of said user equipment (UE),
said method comprising adding information about said user equipment's (UE) ongoing communication to said signalling messages exchanged in said handover process such that individual flow related information of said user equipment's (UE) ongoing flows is included in said signalling messages, and performing at least one of the following steps:
employing said information to treat individual traffic flows of said user equipment's (UE) ongoing communication selectively during said handover process in such a way that the entity preparing the handover decides that only a subset of said user equipment's (UE) currently active flows is handed over while the rest is being dropped, and
employing said information to treat individual traffic flows of said user equipment's (UE) ongoing communication selectively during said handover process in such a way that the entity preparing the handover decides to handover some of the user equipment's (UE) currently active flows to one target point of attachment (PoA) and others of the user equipment's (UE) currently active flows to one or more other target points of attachment (PoAs).

\* \* \* \* \*